Patented Mar. 7, 1939

2,149,335

UNITED STATES PATENT OFFICE

2,149,335

AZO DYE INTERMEDIATES AND METHODS OF PREPARING THEM

Miles Augustinus Dahlen and Frithjof Zwilgmeyer, Wilmington, Del., assignors to E. I. du Pont de Nemours & Company, Wilmington, Del., a corporation of Delaware No Drawing. Application August 17, 1933, Serial No. 685,638

13 Claims. (Cl. 260—250)

This invention relates to the manufacture of new organic compounds, and more particularly refers to the production of new di-acyl-acetyl-amino derivatives of trinuclear organic ring compounds having the following general formula:

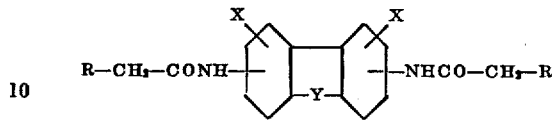

in which R represents an acyl group, X represents hydrogen or one or more non-water-solubilizing groups, and Y represents a bivalent radical.

It is an object of this invention to produce new di-acyl-acetyl-amino derivatives of trinuclear organic ring compounds. A further object is to produce new compounds which are especially adapted for use in the production of water-insoluble dyes and pigments. A still further object is to produce intermediates which are suitable for use as coupling components in the ice color art. Additional objects will become apparent from a consideration of the following description.

These objects are attained according to the herein described invention which in its preferred embodiment comprises reacting a diamine having the following general formula:

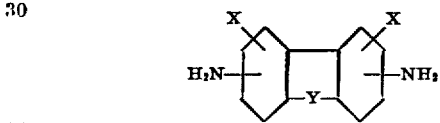

in which the symbols have the same meaning as heretofore, with an acyl-acetylating agent, preferably an ester of an acyl-acetic acid.

The invention may be more readily understood by a consideration of the following illustrative examples, in which the quantities are stated in parts by weight.

Example 1

60 parts of benzidine were added with stirring to 300 parts of oleum of 20% strength, holding the temperature below 60° C. The temperature was then raised to 97–100° C. and held at this point for 3 hours. The reaction mixture was cooled to 25° C., then poured onto 500 parts of ice. The precipitated product was filtered off, washed with water, and sucked dry. The cake was then added to 160 parts of sodium hydroxide solution of 30% strength (a quantity sufficient to neutralize all acidity and give an alkaline test on Clayton yellow papers), and stirred until all sulfonic acids were dissolved. The mass was then filtered, the cake washed first with 200 parts of water and then with 50 parts of ethyl alcohol, and dried. About 53 parts of 4,4'-diamino-diphenyl-2-2'-sulfone ("benzidine-sulfone") were thus obtained.

30 parts of the benzidine-sulfone obtained as above were added with stirring to 70 parts of ethyl-acetoacetate at a temperature of 155° C. The temperature was raised to 168° C. during 20 minutes; then the reaction mass was cooled to room temperature. 80 parts of ethyl alcohol were added, and the precipitated product separated by filtration. The cake was washed with 20 parts of cold alcohol, then dried. About 29 parts of di-aceto-acetyl-benzidine-sulfone of the following probable formula were thus obtained:

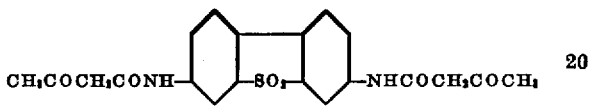

Example 2

Ortho-tolidine was converted to "tolidine-sulfone" (4,4'-diamino-5,5'-dimethyl-diphenyl-2,2'-sulfone) by a process similar to that described in the preceding example. About 54 parts of "tolidine-sulfone" were obtained from 60 parts of ortho-tolidine.

30 parts of tolidine-sulfone obtained as above were added with agitation to 70 parts of ethyl-acetoacetate at 155° C. The mass was heated to 168° C. during 20 minutes, then cooled rapidly to room temperature. 80 parts of ethyl alcohol were added, and the precipitated product separated by filtration. The filter cake was washed with 20 parts of alcohol, then dried. About 29.5 parts of the di-aceto-acetyl derivative of tolidine-sulfone, of the following probable formula, were thus obtained:

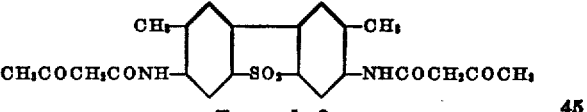

Example 3

12 parts of ketene-dimer were added to 200 parts of dry 3°-xylene, followed by 30 parts of benzidine-sulfone, the latter obtained by the method described in Example 1. The mass was heated to the boiling point in 10 minutes, and held at that temperature for 30 minutes. It was then cooled to 25° C., and the precipitated product separated by filtration. The cake was washed with 20 parts of ethyl alcohol, then dried. About 54

24 parts of diaceto-acetyl-benzidine-sulfone, of the probable formula given in Example 1, were thus obtained.

Example 4

30 parts of tolidine-sulfone, prepared as described in example 2, were added to a mixture of 200 parts of dry xylene and 30 parts of ethyl-acetoacetate. While thoroughly stirred, the mass was heated to the boiling point in 10 minutes and held at that temperature for 60 minutes. It was then cooled to room temperature, and the precipitated product separated by filtration. The filter cake was washed with 20 parts of alcohol, then dried. About 18 parts of di-aceto-acetyl-tolidine-sulfone, of the probable formula given in Example 2, were thus obtained.

Example 5

3,3'-dichloro - 4,4' - diamino - diphenyl ("dichloro-benzidine") was converted to 4,4-diamino - 5,5' - dichloro-diphenyl - 2,2'-sulfone ("dichloro-benzidine-sulfone") by a process similar to that described in Example 1 for the conversion of benzidine to benzidine-sulfone. 52 parts of the sulfone were obtained from 60 parts of dichloro-benzidine.

30 parts of dichloro-benzidine-sulfone were added with stirring to 70 parts of ethyl-acetoacetate at a temperature of 155° C. The reaction mass was heated to 168° C. during 20 minutes, then cooled to room temperature, 80 parts of ethyl alcohol were added, and the precipitated product separated by filtration. The filter cake was washed with 20 parts of ethyl alcohol, then dried. About 28 parts of the di-aceto-acetyl-derivative of dichloro-benzidine-sulfone, of the probable formula given below, were thus obtained:

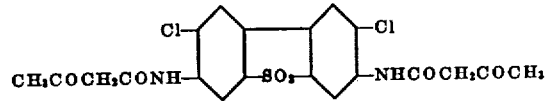

Example 6

50 parts of 4,4'-diamino-diphenyl-2,2'-disulfonic acid disodium salt were added to 460 parts of sodium hydroxide solution of 40% strength. The mass was heated with agitation and under pressure for 6-8 hours at the temperature corresponding with 500 lbs. gage pressure. The mass was then cooled to 25° C., and the contents dissolved in dilute hydrochloric acid. The solution was made slightly alkaline with sodium hydroxide solution, and the 4,4'-diamino-diphenyl-2,2'-oxide which precipitated was separated by filtration. The crude product was redissolved in dilute hydrochloric acid, boiled with a little decoloring charcoal, filtered, and the hydrochloride "salted out" by the addition of sodium chloride. The hydrochloride was separated by filtration, redissolved in water, and converted to the free base by the addition of ammonia. The precipitated base was filtered, washed with water, and dried. About 12.4 parts of 4,4'-diamino-diphenyl-2,2'-oxide were thus obtained.

12 parts of the 4,4'-diamino-diphenyl-2,2'-oxide were added with stirring to 30 parts of ethyl-acetoacetate at a temperature of 155° C. The temperature was raised to 168° C. during 20 minutes, then the mass was cooled to room temperature. 40 parts of ethyl alcohol were added, and the precipitated product separated by filtration. The cake was washed with 10 parts of fresh alcohol, then dried. About 5 parts of the di-aceto-acetyl derivative of the following probable formula were thus obtained:

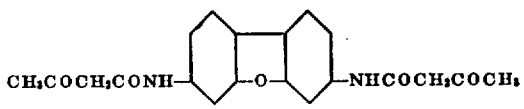

Example 7

31 parts of o-tolidine-sulfate were added to 300 parts of sulfuric acid, the mass heated to 50-60° C., then cooled to 10° C. 20.2 parts of solid potassium nitrate were then added during one-half hour, and the mass stirred for an additional 3 hours, maintaining the temperature at 10° C. during the entire nitration. The completed nitration mass was then added to 900 parts of ice, resulting in the precipitation of the 2,2'-dinitro-5,5'-dimethyl-4,4'-diamino-diphenyl produced. The product was separated by filtration, dissolved in hydrochloric acid, boiled with decolorizing charcoal and clarified by filtration, and the base precipitated by neutralizing the filtrate with sodium carbonate. The purified nitro body was separated by filtration, washed with water, and dried. About 22 parts of the nitro compound were obtained.

20 parts of dinitro-tolidine obtained as above were dissolved with stirring in 250 parts of ethyl alcohol, the mass being heated to the boil. 10 parts of sodium hydroxide were added, and the nitro groups reduced by the addition of 50 parts of zinc dust, the latter being added in small portions during a half hour. The reaction mixture was boiled under reflux for an additional half hour, then cooled to 5° C. and the crystallized product separated by filtration. The filter cake was redissolved in 500 parts of boiling ethyl alcohol, the mass filtered to remove zinc, and the filtrate cooled to 5° C. The product which crystallized was separated by filtration, washed with a little alcohol, and dried. About 6.5 parts of 4,4'-diamino - 5,5'-dimethyl-diphenyl-2,2'-azone ("tolidine-azone") were thus obtained.

5 parts of the tolidine-azone obtained as above were added with stirring to 15 parts of ethyl-acetoacetate at 155° C. The temperature was raised to 168° C. during 20 minutes; then the mass was cooled to 20° C. 15 parts of ethyl alcohol were added, and the precipitated product separated by filtration, washed with 10 parts of ethyl alcohol, and dried. About 6.5 parts of the diaceto-acetyl derivative of tolidine-azone, of the probable formula given below, were thus obtained:

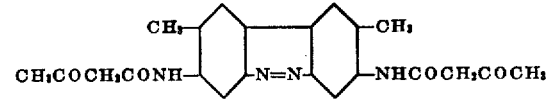

Example 8

Fluorene was dinitrated by dissolving in glacial acetic acid and treating with fuming nitric acid. The nitro compound, obtained by drowning the nitration mass and recrystallizing the precipitated crude product, was reduced to the corresponding diamine by liquid phase hydrogenation in methanol over an active nickel catalyst.

10 parts of the 4,4'-diamino-fluorene obtained as above were added, with stirring, to 50 parts of ethyl-acetoacetate at 155° C. The temperature was raised to 168° C. during 20 minutes, then reduced to 25° C. 30 parts of ethyl alcohol were added, and the product which separated was removed by filtration. The filter cake was washed with 30 parts of fresh alcohol, then dried. About 8 parts of 4,4'-di-aceto-acetyl-amino-fluorene, of the following probable formula, were thus obtained:

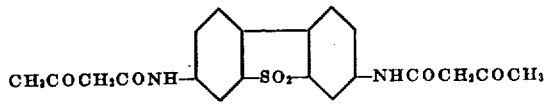

Example 9

Fluorene was oxidized to fluorenone by the action of sodium dichromate. The product was then nitrated and reduced to yield 4,4'-diamino-fluorenone.

10 parts of 4,4'-diamino-fluorenone were added with stirring to 50 parts of ethyl-acetoacetate at a temperature of 155° C. The mass was raised to 168° C. during 20 minutes, then cooled to room temperature and 40 parts of ethyl alcohol added. The precipitated product was separated by filtration, washed with a little fresh alcohol, and dried. About 7 parts of 4,4'-di-aceto-acetyl-amino-fluorenone, of the probable formula given below, were thus obtained:

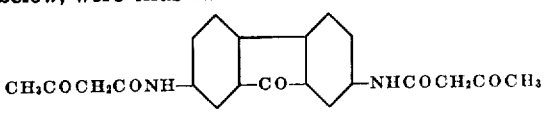

Example 10

3 parts of 4,4'-diamino-phenanthraquinone were added with stirring to 10 parts of ethyl-acetoacetate at 155° C. The mass was heated to 168° C. over a period of 20 minutes, then cooled to 20° C. 9 parts of ethyl alcohol were added, and the product which separated was removed by filtration. The cake was washed with 6 parts of ethyl alcohol, then dried. About 1 part of 4,4'-di-aceto-acetyl-amino-phenanthraquinone of the probable formula given below were thus obtained:

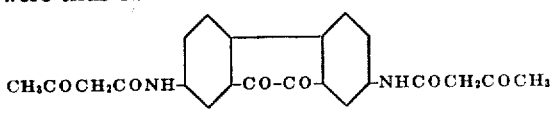

Example 11

10 parts of tolidine-sulfone, prepared as described in Example 2, were added with agitation to 30 parts of ethyl-alpha-furoyl-acetate, at a temperature of 155° C. The mass was heated to 168° C. during 20 minutes, then cooled to 20° C. and 40 parts of ethyl alcohol added. The precipitated product was separated by filtration, washed with 30 parts of alcohol, and dried. About 11 parts of 4,4'-di-(alpha-furoyl-acetyl-amino)-5,5'-dimethyl-diphenyl-2,2'-sulfone, of the probable formula given below, were obtained:

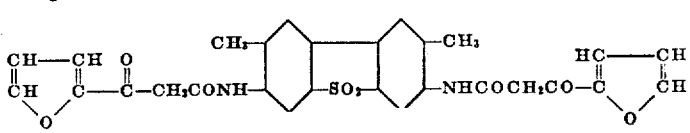

Example 12

The process of Example 11 was repeated, substituting 30 parts of ethyl-benzoyl-acetate for the same quantity of ethyl-furoyl-acetate. Following the same procedure for the condensation, isolation and purification of the product, about 12 parts of 4,4'-di-(benzoyl-acetyl-amino)-5,5'-dimethyl-diphenyl-2,2'-sulfone were obtained. The product had the probable formula:

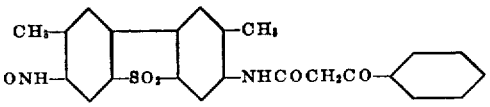

Example 13

The process of Example 11 was repeated, substituting 30 parts of ethyl-para-nitrobenzoyl-acetate for the same quantity of ethyl-furoyl-acetate. Following the same procedure for the condensation, isolation and purification of the product, about 9 parts of 4,4'-di-(para-nitrobenzoyl-acetyl-amino)-5,5'-dimethyl-diphenyl-2,2'-sulfone were obtained. The product had the probable formula:

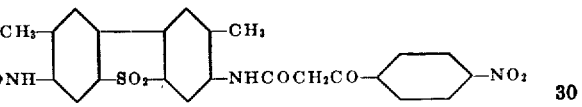

It is apparent that the individual components heretofore selected according to the instructions of the present description for illustrative purposes are merely a very few of the numerous components which fall within the scope hereof. For example, the acyl group, heretofore represented by R, may be derived from various aliphatic, isocyclic, and heterocyclic carboxylic acids. Among the radicals falling within this class mention may be made of the following: propionyl-, butyryl-, decanoyl-, benzoyl-, 4-chloro-benzoyl-, 4-nitro-benzoyl-, alpha-naphthoyl-, furoyl-, and thenoyl. Furthermore, when acyl-acetyl derivatives in which R represents an aroyl group such as benzoyl are selected, it is to be understood that this aroyl nucleus may be further substituted by groups such as alkyl, alkoxy, halogen and nitro. Where it is intended to use the resulting products in the production of insoluble ice colors it is advisable that the components represented by R be free from water-solubilizing groups for instance carboxylic and sulfonic acid groups. With the exception of these solubilizing groups, however, one or more of the well known non-water-solubilizing groups, a few of which have been described, may be used.

The bridge radical heretofore represented by Y is likewise capable of considerable variation. The term "bivalent bridge radical" as used herein is defined to mean: —CH$_2$—, —CO—, —CH=CH—, —CH$_2$CH$_2$—, —NH—, —N alkyl—, —O—, —S—, —N=N—, —N=NO—, —SO$_2$—, and —COCO—.

The benzo nuclei of the trinuclear ring compound may be substituted by one or more groups. As in the case of the acyl residue, where the product is to be used in the production of insoluble ice colors these nuclei should preferably not have water-solubilizing groups substituted thereon. However, they may have one or more of the numerous and commonly used non-water-solubilizing groups substituted thereon, for example, alkyl, alkoxy, halogen, and nitro.

Optimum results are in general obtained by selecting an aceto-acetyl derivative, suitable for entering into the reactions illustrated in the examples, and reacting said derivative with the diamines heretofore described. Such compounds ordinarily appear to be superior to those containing other acyl nuclei. Nevertheless, it is to be understood that the invention is not restricted thereto since the compounds having aroyl or other acyl nuclei included therein are quite satisfactory for many purposes. The amino groups of the trinuclear diamines may occupy various positions on the benzo nuclei of such compounds. For instance, they may occupy the 6—6', 5—5', 4—6', as well as similar free positions. As previously mentioned, the 4—4'-diamino derivatives are preferred since they usually result in the production of compounds which exhibit marked affinity for cellulose fibers, and are therefore especially useful for the preparation of ice colors on such fibers.

The products described herein may be produced by the condensation of trinuclear diamines with esters of acyl-acetic acids. This condensation may be effected by the treatment of the diamines with an excess of the ester under proper conditions of time and temperature, such conditions being capable of considerable variation without appreciably affecting the results. Alternatively, the condensation may be carried out in a solvent or diluent such as chloro-benzene, xylene, nitrobenzene, etc., using approximately equivalent quantities of the diamino compound and ester.

Some of these new products may likewise be prepared by the action of the dimer of ketene (referred to both as acetyl-ketene and cyclobuta-1:3-dione). Here again the reaction may be carried out by heating the diamine with an excess of the acyl-acetylating agent or by dissolving or suspending it in an inert solvent and treating it with approximately an equivalent quantity of the ketene-dimer. This method of preparation is, of course, applicable only to the production of those products in which the acyl residue is an acetyl group.

This invention permits the utilization of an entirely new class of compounds in the preparation of dyes and pigments. Many of the components required herein are readily available at a low cost, and since the products have, in general, excellent characteristics it is possible to duplicate and in some cases improve on the results obtained by the use of intermediates used in the prior art. These compounds are especially valuable for use in one-bath printing processes, which is a distinct advantage at the present time. In addition to the aforementioned advantages it may be stated that the products described herein are adapted for use in many other connections wherein prior art acyl-acetyl derivatives were formerly utilized.

As many apparently widely different embodiments of this invention may be made without departing from the spirit and scope thereof, it is to be understood that the invention is not limited to the specific embodiments thereof except as defined in the appended claims.

We claim:

1. A compound represented by the formula:

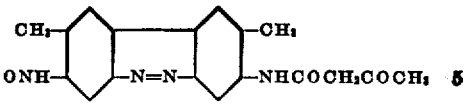

2. A compound represented by the formula:

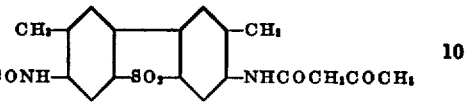

3. A compound represented by the formula:

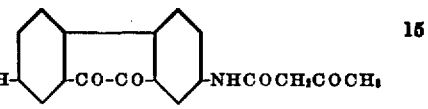

4. The compound represented by the formula:

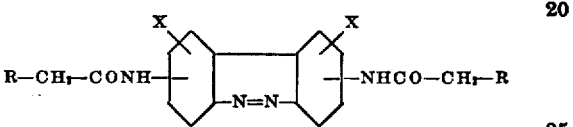

in which R represents acyl, and X represents one of a group consisting of hydrogen, alkyl, alkoxy, halogen, and nitro.

5. The compound represented by the formula:

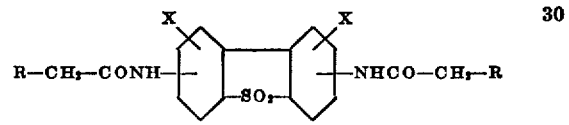

in which R represents acyl, and X represents one of a group consisting of hydrogen, alkyl, alkoxy, halogen, and nitro.

6. The compound represented by the formula:

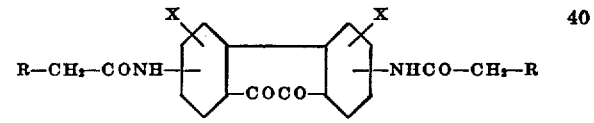

in which R represents acyl, and X represents hydrogen, alkyl, alkoxy, halogen, and nitro.

7. The compound represented by the formula:

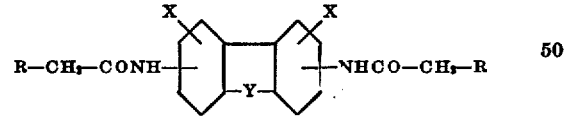

in which R represents an acyl group, X represents one of the group consisting of hydrogen, alkyl, alkoxy, halogen, and nitro groups, and Y represents a bivalent bridge radical.

8. A compound being an n:n'-diacyl-acetyl-trinuclear-arylene-diamine in which two members of the nucleus are interconnected benzene rings and the third member of the nucleus is a bivalent bridge radical connected to each of said rings.

9. The process which comprises heating about 5 parts of 4:4'-diamino-5:5'-dimethyl-diphenyl-2:2'-azone with about 15 parts of ethyl-acetoacetate at about 155° C. and 168° C., adding alcohol, and isolating the product.

10. The process which comprises reacting about 30 parts of 4:4'-diamino-5:5'-dimethyl-diphenyl-2:2'-sulfone with about 70 parts of ethyl-acetoacetate by mixing at about 155° C., heating the mixture at about 168° C., cooling, adding alcohol, and isolating the product.

11. The process which comprises reacting about 3 parts of 4:4'-diamino-phenanthraquinone with about 10 parts of ethyl-aceto-acetate by mixing at about 155° C. and heating to about 168° C., cooling, adding alcohol, and isolating the product.

12. A process for making di-acyl-acetyl-amino derivatives of trinuclear organic ring compounds which comprises heating a diamine represented by the formula:

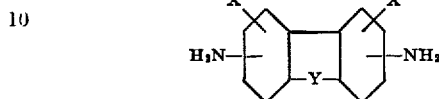

in which each X represents one of the group consisting of hydrogen, alkyl, alkoxy, halogen, or nitro, and Y represents a bivalent bridge radical, with an ester of an acyl-acetic acid.

13. A process which comprises reacting a diamine represented by the formula:

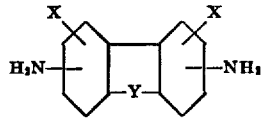

in which X represents one of a group consisting of hydrogen, alkyl, alkoxy, halogen, and nitro and Y represents a bivalent bridge radical with an acyl-acetylating agent.

MILES AUGUSTINUS DAHLEN.
FRITHJOF ZWILGMEYER.

CERTIFICATE OF CORRECTION.

Patent No. 2,149,335.                                March 7, 1939.

MILES AUGUSTINUS DAHLEN, ET AL.

It is hereby certified that error appears in the printed specification of the above numbered patent requiring correction as follows: Page 3, first column, lines 6 to 9 inclusive, in the formula, for the compound between the rings "SO₂" read CH₂; and that the said Letters Patent should be read with this correction therein that the same may conform to the record of the case in the Patent Office.

Signed and sealed this 18th day of April, A. D. 1939.

Henry Van Arsdale (Seal)                                Acting Commissioner of Patents.

3 parts of 4:4'-diamino-phenanthraquinone with about 10 parts of ethyl-aceto-acetate by mixing at about 155° C. and heating to about 168° C., cooling, adding alcohol, and isolating the product.

12. A process for making di-acyl-acetyl-amino derivatives of trinuclear organic ring compounds which comprises heating a diamine represented by the formula:

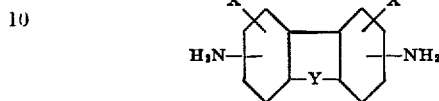

in which each X represents one of the group consisting of hydrogen, alkyl, alkoxy, halogen, or nitro, and Y represents a bivalent bridge radical, with an ester of an acyl-acetic acid.

13. A process which comprises reacting a diamine represented by the formula:

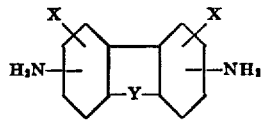

in which X represents one of a group consisting of hydrogen, alkyl, alkoxy, halogen, and nitro and Y represents a bivalent bridge radical with an acyl-acetylating agent.

MILES AUGUSTINUS DAHLEN.
FRITHJOF ZWILGMEYER.

CERTIFICATE OF CORRECTION.

Patent No. 2,149,335.   March 7, 1939.

MILES AUGUSTINUS DAHLEN, ET AL.

It is hereby certified that error appears in the printed specification of the above numbered patent requiring correction as follows: Page 3, first column, lines 6 to 9 inclusive, in the formula, for the compound between the rings "SO₂" read CH₂; and that the said Letters Patent should be read with this correction therein that the same may conform to the record of the case in the Patent Office.

Signed and sealed this 18th day of April, A. D. 1939.

Henry Van Arsdale (Seal)   Acting Commissioner of Patents.